(12) United States Patent
Schoenherr et al.

(10) Patent No.: US 11,289,746 B2
(45) Date of Patent: Mar. 29, 2022

(54) COOLING ARRANGEMENT FOR AN ENERGY STORAGE DEVICE

(71) Applicants: Bosch Battery Systems LLC, Orion, MI (US); Robert Bosch GmbH, Stuttgart (DE)

(72) Inventors: Robert Schoenherr, Oxford, MI (US); Mark Kotik, Rochester Hills, MI (US)

(73) Assignees: Bosch Battery Systems LLC, Orion, MI (US); Robert Bosch GmbH, Stuttgart (DE)

(*) Notice: Subject to any disclaimer, the term of this patent is extended or adjusted under 35 U.S.C. 154(b) by 803 days.

(21) Appl. No.: 15/145,227

(22) Filed: May 3, 2016

(65) Prior Publication Data

US 2017/0324125 A1 Nov. 9, 2017

(51) Int. Cl.
*H01M 10/613* (2014.01)
*H01M 10/647* (2014.01)
*H01M 10/6555* (2014.01)
*H01M 10/654* (2014.01)
*H01M 50/10* (2021.01)
(Continued)

(52) U.S. Cl.
CPC ..... *H01M 10/613* (2015.04); *H01M 10/0413* (2013.01); *H01M 10/0472* (2013.01); *H01M 10/625* (2015.04); *H01M 10/647* (2015.04); *H01M 10/654* (2015.04); *H01M 10/6551* (2015.04); *H01M 10/6553* (2015.04); *H01M 10/6554* (2015.04); *H01M 10/6555* (2015.04); *H01M 50/10* (2021.01); *H01M 50/116* (2021.01); *H01M 50/20* (2021.01); *H01M 50/531* (2021.01); *H01M 50/54* (2021.01); *H01M 50/543* (2021.01); *H01M 50/131* (2021.01); *H01M 50/502* (2021.01); *H01M 50/529* (2021.01); *H01M 2220/20* (2013.01)

(58) Field of Classification Search
CPC ........... H01M 10/613; H01M 10/6651; H01M 10/6554; H01M 10/625; H01M 2/1077; H01M 2/26; H01M 2/0275; H01M 2/0262
See application file for complete search history.

(56) References Cited

U.S. PATENT DOCUMENTS 7,997,367 B2 8/2011 Nakamura
8,153,290 B2 4/2012 Hermann et al.
(Continued)

FOREIGN PATENT DOCUMENTS

CN 204809357 11/2015
DE 102013016790 7/2014
(Continued)

OTHER PUBLICATIONS

PCT International Search Report for PCT/EP2017/058084 dated May 31, 2017.

*Primary Examiner* — Stewart A Fraser
(74) *Attorney, Agent, or Firm* — Kelly McGlashen; Maginot, Moore & Beck LLP

(57) ABSTRACT

A battery pack includes a thermally conductive plate that can be cooled or heated, and an array of electrochemical cells. The cells include a stacked or rolled arrangement of electrode plates, and a current collector disposed in the battery cell that forms an electrical connection with the electrode plates and provides a thermal conduction pathway for conducting heat from the electrode plates to the thermally conductive plate.

18 Claims, 7 Drawing Sheets

(51) Int. Cl.
*H01M 50/20* (2021.01)
*H01M 50/54* (2021.01)
*H01M 10/6553* (2014.01)
*H01M 10/04* (2006.01)
*H01M 50/116* (2021.01)
*H01M 50/531* (2021.01)
*H01M 50/543* (2021.01)
*H01M 10/625* (2014.01)
*H01M 10/6551* (2014.01)
*H01M 10/6554* (2014.01)
*H01M 50/131* (2021.01)
*H01M 50/502* (2021.01)
*H01M 50/529* (2021.01)

(56) References Cited

U.S. PATENT DOCUMENTS

| | | | |
|---|---|---|---|
| 8,568,918 | B2 | 10/2013 | Schroeter et al. |
| 2014/0087231 | A1* | 3/2014 | Schaefer ............ H01M 10/5053 |
| | | | 429/120 |
| 2014/0331688 | A1 | 11/2014 | Kossakovski et al. |
| 2015/0064511 | A1 | 3/2015 | Wang et al. |
| 2016/0111750 | A1* | 4/2016 | Tanida ................... H01G 11/76 |
| | | | 29/623.2 |
| 2016/0190651 | A1 | 6/2016 | Inagaki et al. |

FOREIGN PATENT DOCUMENTS

| | | |
|---|---|---|
| DE | 102014202337 | 8/2015 |
| JP | 2012079833 | 4/2012 |
| JP | 2015179578 | 9/2015 |
| WO | 2015040709 | 3/2015 |

\* cited by examiner

COOLING ARRANGEMENT FOR AN ENERGY STORAGE DEVICE

BACKGROUND

Field of the Invention

The present invention relates to a battery cell that includes a stacked or rolled arrangement of electrode plates, and a current collector disposed in the battery cell that forms an electrical connection with the electrode plates and provides a thermal conduction pathway for conducting heat from the electrode plates to an external cooling plate.

Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells are arranged in two or three dimensional arrays and are electrically connected in series or in parallel. Likewise, the battery modules within a battery pack are electrically connected in series or in parallel.

The performance, life and safety of electrochemical cells are all affected by the operation temperature of the cell. Some conventional cells are cooled during operation by placing one or several of the cell surfaces in contact with a cooling medium such as a liquid-cooled plate or a flowing mass of air. Such cooling methods may present problems, which include, but are not limited to, a) increased battery pack cost since liquid cooling systems are expensive due to costs associated with driving fluids through the system; b) decreased battery efficiency pack since, in an electric vehicle application, energy from the cells is used to cool the cells, which in turn may generate more heat which needs to be removed; and c) cell thermal performance may limit the effectiveness of external cooling since cells may have a high thermal gradient internally due to the inefficient heat path to the exterior of the cell. Moreover, some cells may have degraded performance when operating in very cold conditions, such as can occur during winter months in northern climates. A need exists for a cell that has effective, efficient and low cost features for controlling cell temperature.

SUMMARY

In some aspects, an electrochemical cell includes a polyhedronal cell housing formed of a flexible laminate material. The cell housing includes a first end, a second end opposed to the first end, and a multi-sided sidewall that extends between the first end and the second end. The cell includes an electrode assembly disposed in the cell housing. The electrode assembly including a positive electrode plate, a negative electrode plate and a separator. The positive electrode plate is stacked with the negative electrode plate, and the separator is disposed between the positive electrode plate and the negative electrode plate. The electrode assembly includes a stack axis that extends in parallel to a stacking direction of the positive electrode plate, the negative electrode plate and the separator, and the stack axis extends perpendicular to the cell housing first and second ends. The cell includes a current collector disposed in the cell housing. The current collector includes a collection portion disposed between the electrode assembly and one side of the multi-sided sidewall, the collection portion extending parallel to the one side and being electrically and thermally connected to one of the positive electrode plate and the negative electrode plate. In addition, the current collector includes a fin portion that is electrically and thermally connected to the collection portion and extends in a direction parallel to the second end, and a terminal disposed on the outside of the cell housing so as to overlie the one side, the terminal being electrically and thermally connected to the collection portion.

The cell may include one or more of the following features: The fin portion is disposed outside the cell housing and overlies the second end. A first end of the terminal is connected to the collection portion and a second end of the terminal is connected to the fin portion, and the second end is opposed to the first end. The fin portion is disposed inside the cell housing between the electrode assembly and the second end. The terminal is connected to a second end of the collection portion and the fin portion is connected to a first end of the collection portion, and the second end is opposed to the first end. The terminal is connected to the collection portion via an opening in the one side. The current collector is a positive current collector and is electrically and thermally connected to the positive electrode plate, and the cell includes a negative current collector disposed in the cell housing. The negative current collector includes a collection portion disposed between the electrode assembly and the sidewall, the collection portion extending parallel to the sidewall and being electrically and thermally connected to the negative electrode plate. In addition, the negative current collector includes a fin portion that is electrically and thermally to the collection portion and extends in, a direction parallel to the second end. The positive current collector and the negative current collector each exit the cell housing at the first end. The current collector has a dimension in a direction that is transverse to the stack axis and parallel to the one side, and the dimension is in a range of 30 percent to 98 percent of a corresponding dimension of the one side. The current collector provides two thermal conduction pathways between the one of the positive electrode plate and the negative electrode plate and an exterior of the cell housing.

In some aspects, a battery pack includes a thermally-conductive plate configured to provide one of heating and cooling, and electrochemical cells supported on the thermally-conductive plate. Each cell includes a polyhedronal cell housing formed of a flexible laminate material, the cell housing including a first end, a second end opposed to the first end and facing the thermally-conductive plate, and a multi-sided sidewall that extends between the first end and the second end. Each cell includes an electrode assembly disposed in the cell housing, the electrode assembly including a positive electrode plate, a negative electrode plate and a separator. The positive electrode plate is stacked with the negative electrode plate, and the separator is disposed between the positive electrode plate and the negative electrode plate. The electrode assembly includes a stack axis that extends in parallel to a stacking direction of the positive electrode plate, the negative electrode plate and the separator, and the stack axis extends perpendicular to the cell housing first and second ends. Each cell includes a current collector disposed in the cell housing. The current collector includes a collection portion disposed between the electrode assembly and one side of the multi-sided sidewall, the collection portion extending parallel to the one side and being electrically and thermally connected to one of the positive electrode plate and the negative electrode plate. In addition, the current collector includes a fin portion that is electrically and thermally connected to the collection portion and extends in a direction parallel to the second end, and a terminal disposed on the outside of the cell housing so as to overlie the one side, the terminal being electrically and thermally connected to the collection portion.

The battery pack may include one or more of the following features: The fin portion is disposed outside the cell housing and overlies the second end. A first end of the terminal is connected to the collection portion and a second end of the terminal is connected to the fin portion, and the second end is opposed to the first end. The fin portion is disposed inside the cell housing between the electrode assembly and the second end. The terminal is connected to a first end of the collection portion and the fin portion is connected to a second end of the collection portion, and the second end is opposed to the first end. The terminal is connected to the collection portion via an opening in the one side. The current collector is a positive current collector and is electrically and thermally connected to the positive electrode plate, and the electrochemical cell comprises a negative current collector disposed in the cell housing. The negative current collector includes a collection portion disposed between the electrode assembly and another side of the multi-sided sidewall, the collection portion extending parallel to the sidewall and being electrically and thermally connected to the negative electrode plate. The negative current collector includes a fin portion that is electrically and thermally to the collection portion and extends in a direction parallel to the second end, and the positive current collector and the negative current collector each exit the cell housing at the first end. The current collector has a dimension in a direction that is transverse to the stack axis and parallel to the one side, and the dimension is in a range of 30 percent to 98 percent of a corresponding dimension of the one side. The current collector provides two thermal conduction pathways between the one of the positive electrode plate and the negative electrode plate and an exterior of the cell housing.

In some aspects, a battery pack includes a thermally-conductive plate configured to provide one of heating and cooling, and electrochemical cells supported on the thermally-conductive plate. Each cell includes a polyhedronal cell housing formed of a flexible laminate material, the cell housing including a first end, a second end opposed to the first end, and a multi-sided sidewall that extends between the first end and the second end. A first side of the multi-sided sidewall faces the thermally-conductive plate. An electrode assembly is disposed in the cell housing. The electrode assembly includes a positive electrode plate, a negative electrode plate and a separator. The positive electrode plate is stacked with the negative electrode plate, and the separator is disposed between the positive electrode plate and the negative electrode plate. The electrode assembly includes a stack axis that extends in parallel to a stacking direction of the positive electrode plate, the negative electrode plate and the separator, and the stack axis extends perpendicular to the cell housing first and second ends. Each cell includes a first current collector disposed in the cell housing, the first current collector disposed between the electrode assembly and the first side. The first current collector extends parallel to the first side and is electrically and thermally connected to one of the positive electrode plate and the negative electrode plate. Each cell includes a second current collector disposed in the cell housing, the second current collector disposed between the electrode assembly and a third side of the multi-sided sidewall, the third side being opposed to the first side. The second current collector extends parallel to the third side and is electrically and thermally connected to the other of the positive electrode plate and the negative electrode plate. Each cell includes a first terminal disposed on the outside of the cell housing so as to overlie the cell housing. The first terminal is electrically and thermally connected to the first current collector. Each cell includes a second terminal disposed on the outside of the cell housing so as to overlie the cell housing. The second terminal is electrically and thermally connected to the second current collector. The positive current collector and the negative current collector each exit the cell housing at the first end, and the first current collector provides a thermal conduction path from the electrode assembly to the thermally-conductive plate via the first side.

In some aspects, a pouch cell includes an electrode assembly that is sealed within a flexible metal foil laminate cell housing along with an electrolyte to form an energy storage unit. The electrode assembly is a "stacked" electrode assembly that includes a series of stacked positive electrode plates alternating with negative electrode plates and separated by an intermediate separator plates. In addition, the pouch cell includes current collectors that form an electrical connection with the electrode plates and also provides a thermal conduction pathway for conducting heat from the electrode plates. The current collectors allow passage of current generated in the electrode assembly to pass through the current collector and out of the cell to a terminal, and also allow thermal conduction of heat generated in the electrode assembly to pass through the current collector and out of the cell to an external, thermally-conductive plate.

Advantageously, the internal current collectors of the cell are used to extract heat directly from the electrodes and transfer it via a thermally conductive path to the exterior of the cell. The exterior conductor portion of the current collector is in direct contact with the thermally conductive plate, providing a high thermally conductive pathway between the electrodes (heat source) to the cooling medium (heat sink). As a result, thermal resistance between the cell heat source and the heat sink is reduced, and heat distribution within the cell is more uniform relative to some conventional cells.

Further advantageously, the external, thermally-conductive plate can be used for cell cooling, as described herein, or for cell heating by controlling the temperature of the plate. In some embodiments, this is achieved by controlling a temperature of a fluid passing through the plate.

DETAILED DESCRIPTION

Figure 1:
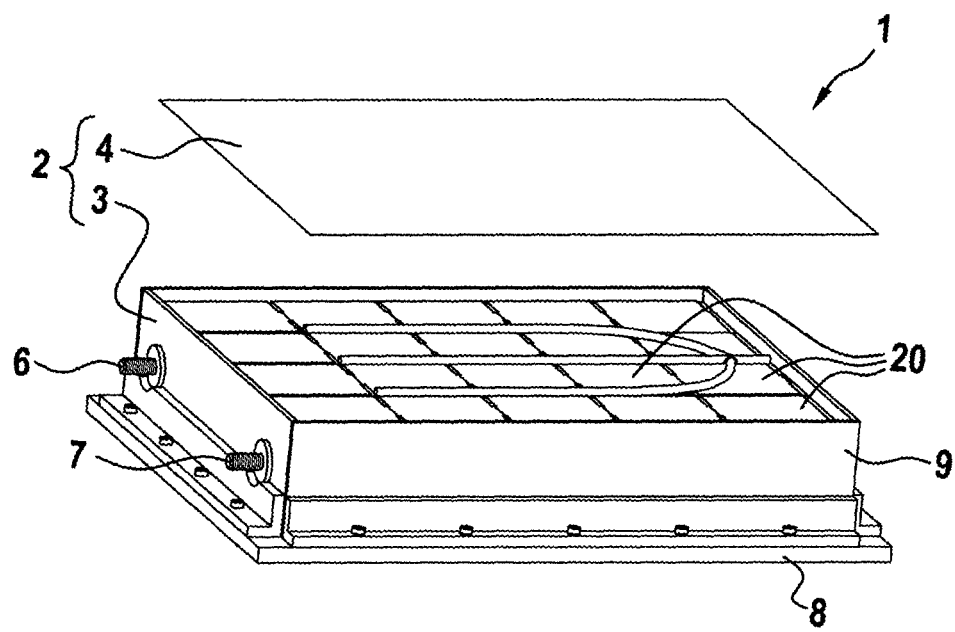
FIG. 1 a partially exploded perspective view of a battery pack including an array of pouch cells.
Figure 2:
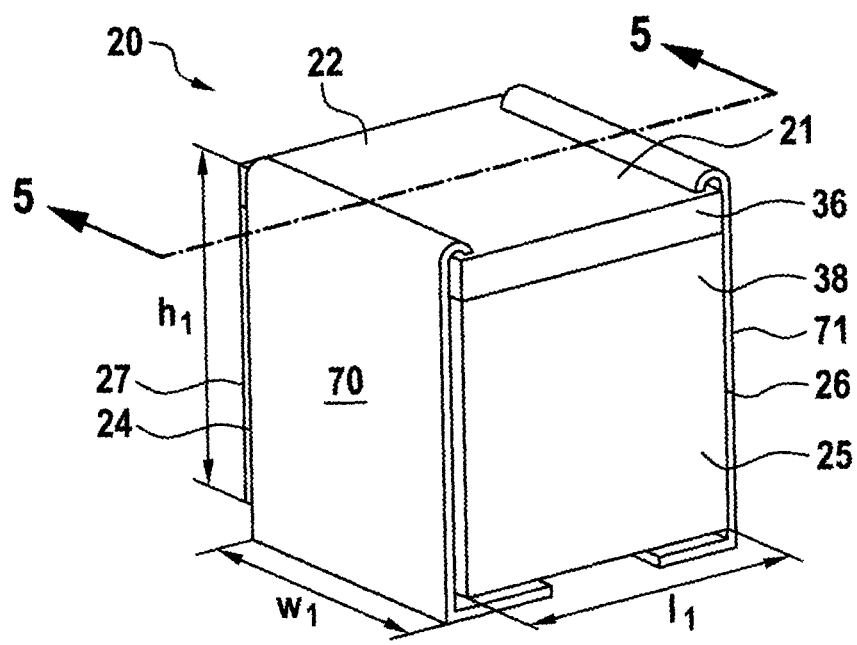
FIG. 2 is a perspective view of a pouch cell of the battery pack.

Referring to FIGS. 1-2, a battery pack 1 used to provide electrical power includes electrochemical cells 20 that are electrically interconnected and stored in an organized manner within a battery pack housing 2. The battery pack housing 2 includes a container portion 3 and a detachable lid 4. The container portion 3 includes a base 8 and a sidewall 9 that encloses a peripheral edge of the base 8. The base 8 serves as a heat sink or a heat source. To this end, the base 8 is formed of a thermally conductive material. In some embodiments, an inward-facing (e.g., cell-supporting) surface of the base 8 is formed of or coated with an electrically isolating material. In addition, the base 8 may include fluid channels (not shown) configured to permit a flow of cooling or heating fluid through the base 8. For purposes of illustration, only the cooling function of the base 8 will be described herein. In use, the lid 4 is secured to an upper edge of the sidewall 9 so as to close the open end of the container portion 3.

The cells 20 are supported on the base 8, and are lithium-ion pouch cells that include an electrode assembly 60 (FIGS. 3 and 4) that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery pack housing 2, the cells 20 are electrically connected in series or in parallel.

Each cell 20 includes a pouch-type cell housing 21 that is an assembly of two box shaped portions 36, 38 that are formed of a metal laminated film and joined together along a sealed joint (not shown). The cell housing 21 has a rectangular shape, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

Although the cell housing 21 may be formed having any proportions, in some embodiments the cell housing 21 is a "deep" pouch cell housing having a relatively large aspect ratio of cell height h1 (for example, a dimension parallel to a stacking direction of plates of the electrode) to cell length l1 or width w1, for example greater than 0.1. In the illustrated embodiment, the cell housing 21 is cube shaped, each side having a dimension that is greater than a draw depth of the metal used to form cell housing 21, for example, greater than 20 mm for a cell housing formed of an aluminium laminated film.

Figure 3:
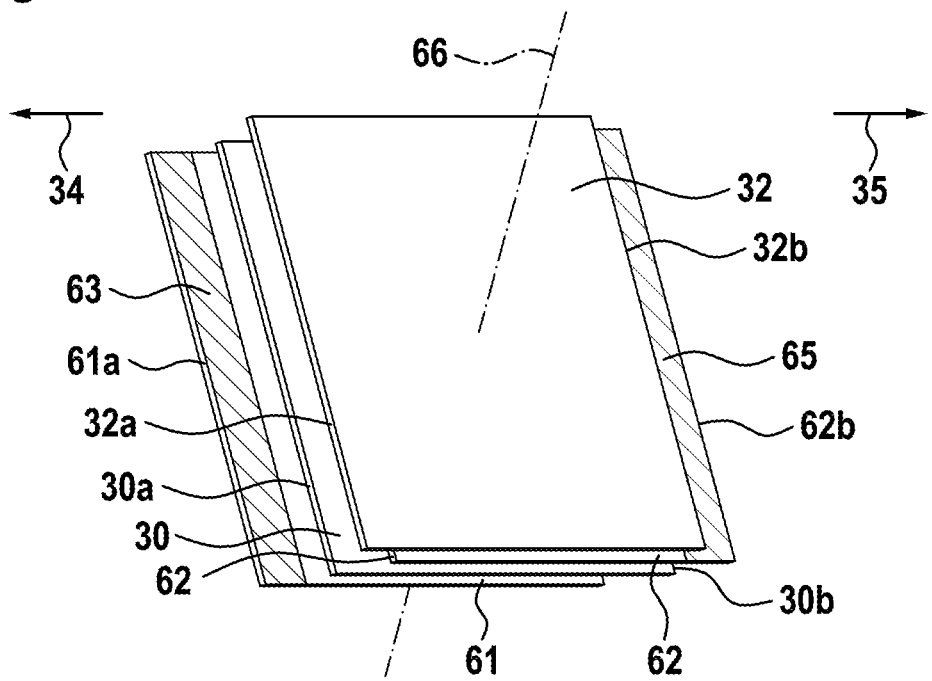
FIG. 3 is a perspective view of an electrode pair including a positive electrode plate, a negative electrode plate, and separator plates alternating with the positive and negative electrode plates.
Figure 4:
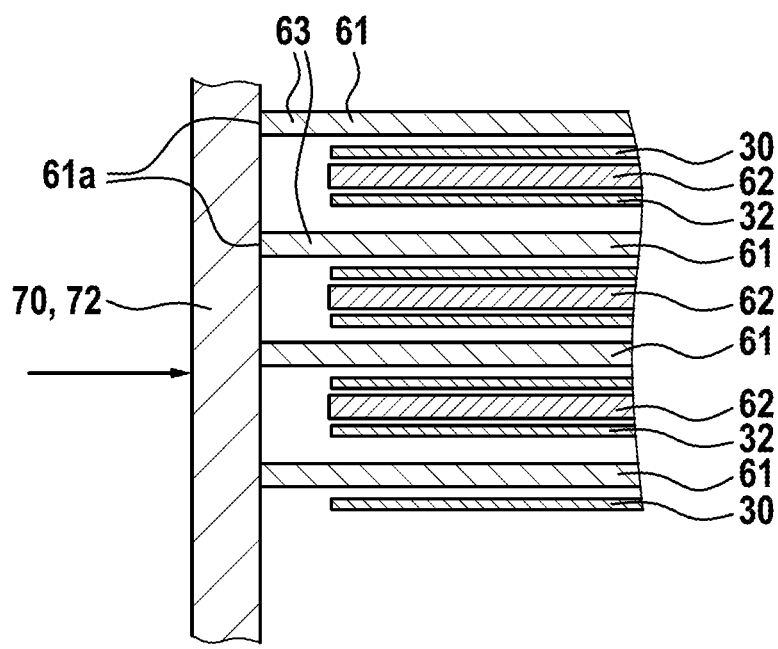
FIG. 4 is a cross sectional view of a portion of the pouch cell of FIG. 2 illustrating an electrode configuration, where the portion is indicated by dashed lines in FIG. 5.
Figure 5:
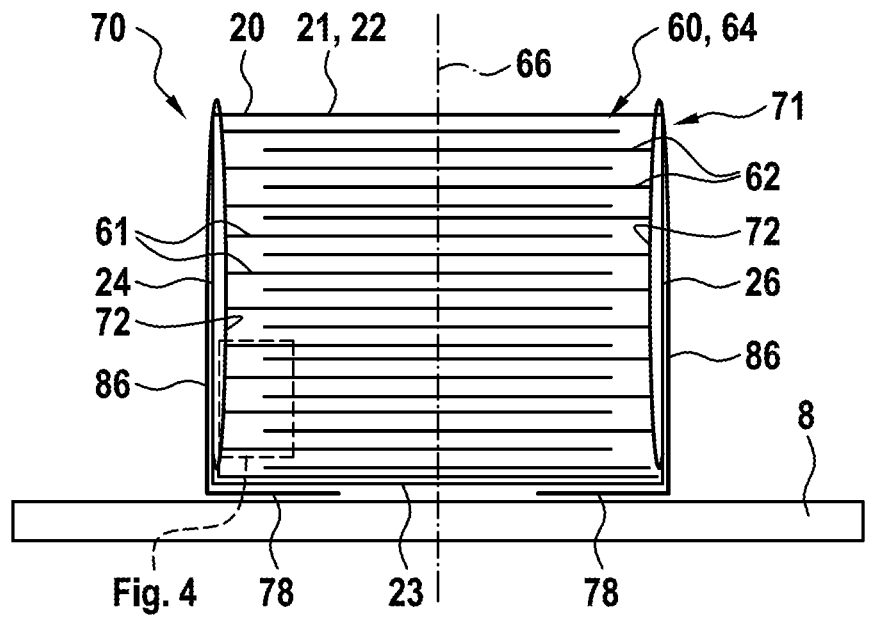
FIG. 5 is a schematic cross sectional view of the pouch cell of FIG. 2 as seen across line 5-5 of FIG. 2, illustrating a pair of current collectors.

Referring to FIGS. 3-5, the electrode assembly 60 disposed in the cell 20 includes a series of stacked positive electrode plates 61 alternating with negative electrode plates 62 and separated by intermediate separator plates 30, 32. The separator plates 30, 32 are non-electrically conductive. The series of stacked electrode and separator plates will be referred to herein as the "plate stack" 64, and a stack axis 66 of the plate stack 64 extends through a center of the plate stack 64 in a direction parallel to the stacking direction. The electrode plates 60, 61 are very thin (e.g., having a thickness on the order of about 0.095 to 0.145 mm) compared to the overall cell thickness (e.g. having a thickness on the order of tens or hundreds of mm) and thus are illustrated schematically in FIG. 5.

During stacking, the positive electrode plates 61, the negative electrode plates 62 and the separator plates 30, 32 that form the electrode assembly 60 are arranged in a layered or stacked configuration in the stacking direction. In the stacked configuration, the separator plates 30, 32, are stacked along the stack axis 66 such that peripheral edges of all the separator plates 30, 32 of the stack 64 are aligned in a direction parallel to the direction of the stack axis 66. However, the positive and negative electrode plates 61, 62 are partially offset in a direction transverse to the stack axis (i.e., a length direction) relative to the respective separator plates 30, 32 (FIG. 3).

In particular, the positive electrode plates 61 are stacked along the stack axis 66 such that peripheral edges of the positive electrode plates 61 are aligned with each other in a direction parallel to the direction of the stack axis 66 but are partially offset relative to the separator plates 30, 32 in a first direction parallel to the length direction. The first direction is represented in FIG. 3 by arrow 34. Thus, one edge 61*a* of each of the positive electrode plates 61 extends beyond a corresponding edge 30*a*, 32*a* of the separator plates 30, 32 resulting in a positive "clear lane" 63 of exposed conductive material. The positive clear lane 63 is used to form an electrical contact with a positive current collector 70, as discussed further below.

The negative electrode plates 62 are stacked along the stack axis 66 such that peripheral edges of the negative electrode plates 62 are aligned with each other in a direction parallel to the direction of the stack axis 66 but are partially offset relative to the separator plates 30, 32, in a second direction, where the second direction is parallel to the length direction and opposed to that of the first direction. The second direction is represented in FIG. 3 by arrow 35. Thus, one edge 62*b* of each of the negative electrode plates 62 extends beyond a corresponding edge 30*b*, 32*b* of the separator plates 30, 32 resulting in a negative "clear lane" 65 of exposed conductive material. The negative clear lane 65 is used to form an electrical contact with a negative current collector 71, as discussed further below.

Figure 6:
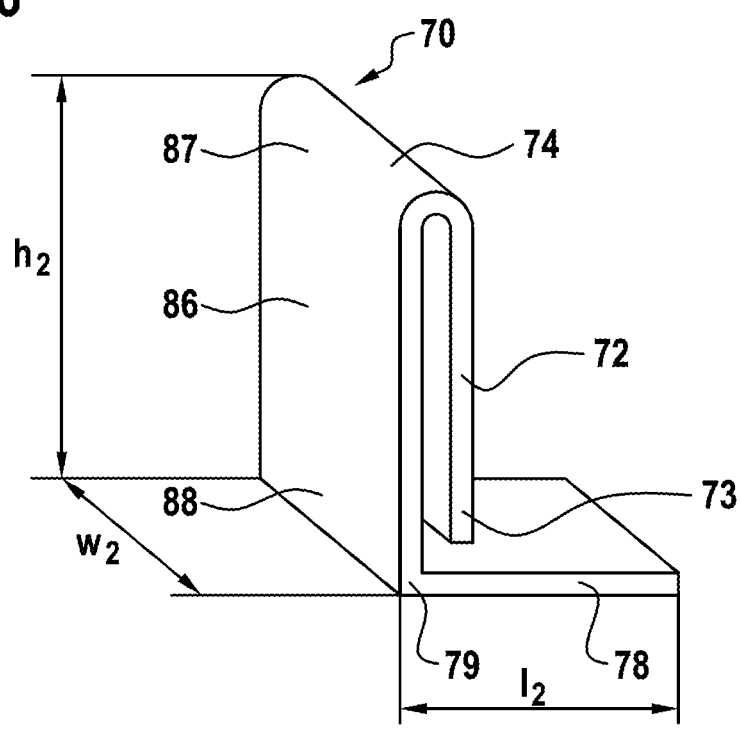
FIG. 6 is a perspective view of one of the current collectors of FIG. 5.

Referring to FIGS. 5 and 6, each cell 20 also includes a pair of current collectors 70, 71 that form an electrical and thermal connection with the electrode plates 60, 61 of the plate stack 64. The pair of current collectors 70, 71 includes a first (i.e., positive) current collector 70, and a second (i.e., negative) current collector 71 that has the same shape and dimensions as the first current collector 70. For this reason, only the first current collector 70 will be described in detail and common reference numbers will be used to refer to common elements.

The first current collector 70 is an electrically and thermally conductive thin plate having a folded and bent configuration. The first current collector 70 includes a collection portion 72 disposed inside the cell housing 21 and in direct contact with the electrode assembly 60, a fin portion 78 disposed outside the cell housing 21 and in direct contact with the cooling base 8, and a cell terminal portion 86 disposed outside the cell housing 21 and connecting an end 74 of the collection portion 72 to an end 79 of the fin portion 78.

The collection portion 72 is generally planar and is disposed between the electrode assembly 60 and a side (e.g., the first side 24) of the cell housing 21. The collection portion 72 extends in parallel to the first side 24 and is electrically and thermally connected to electrode plates of the electrode assembly 60 having a common polarity. In the illustrated embodiment, the collection portion 72 is electrically and thermally connected to the positive electrode plates 61. More specifically, the collection portion 72 of the first current collector 70 is disposed between the positive "clear lane" 63 of the positive electrode plates 61 and one side, e.g., the first side 24, of the cell housing 21. The collection portion 72 of the first current collector 70 is electrically and thermally connected via direct contact to a peripheral edge 61a of the positive electrode plates 61 and joins the positive electrode plates 61 to both the (positive) cell terminal portion 86 and the base 8 disposed outside the cell housing 21, as discussed below.

A first end 73 of the collection portion 72 resides adjacent the cell housing second end 23, and an opposed second end 74 of the collection portion 72 protrudes out of the cell housing first end 22 by passing through the sealed joint at this location. The collection portion second end 74 is folded back on itself to form a U-shaped bend.

A first end 87 of the cell terminal portion 86 extends integrally from the collection portion second end 74, and thus is electrically and thermally connected to the collection portion 72. The cell terminal portion 86 is disposed on the outside of the cell housing 21 so as to overlie the cell housing first side 24. The cell terminal portion 86 is generally planar, and extends generally parallel to the collection portion 72. The cell terminal portion 86 has sufficient length that the cell terminal portion second end 88 is disposed adjacent the cell housing second end 23, and is slightly longer than the collection portion 72.

Like the cell terminal portion 86, the fin portion 78 is disposed on the outside of the cell housing 21. The fin portion 78 is generally planar and extends integrally from the second end 88 of the cell terminal portion 86 so as to be arranged perpendicular to both the collection portion 72 and the cell terminal portion 86. The fin portion 78 is electrically and thermally connected to the collection portion 72 via the cell terminal portion 86, and extends in a direction parallel to, and overlies, the cell housing second end 23. The fin portion 78 is disposed between the cell housing second end 23 and the cooling base 8. More specifically, an outward-facing surface of the fin portion 78 rests on and directly contacts an inward-facing surface of the base 8. The fin portion 78 has a length in a range of two percent to less than fifty percent of the length of the cell housing second end 23. A length that is equal to or greater than fifty percent is undesirable as it would result in contact with the fin portion 78 of the second current collector 71 and an electrical short circuit therewith. In the illustrated embodiment, the fin portion 78 has a length of about 25 percent of the length of the cell housing second end 23, whereby a relatively large area of direct contact is provided between the fin portion 78 and the base 8, resulting in efficient cooling within the cell 20.

The second current collector 71 is disposed in the cell housing 21 on an opposed side of the electrode assembly 60 relative to the first current collector 70, and the collection portion 72 of the second current collector 71 is electrically and thermally connected to the negative electrode plates 62. In particular, the collection portion 72 of the second current collector 71 is disposed between the negative clear lane 65 of the negative electrode plates 62 and the opposed side, e.g., the third side 26, of the cell housing 21. The collection portion 72 of the second current collector 71 is electrically and thermally connected via direct contact to the negative electrode plates 62 and joins the negative electrode plates 62 to both the (negative) cell terminal portion 86 and, via the fin portion 78 of the second current collector 71, to the base 8 disposed outside the cell housing 21.

In the embodiment illustrated in FIG. 5, the inward-facing surface of the base 8 is formed of or coated with a non-electrically conductive material to prevent an electrical short circuit between the respective fin portions 78 of the first and second current collectors 70, 71.

Each current collector 70, 71 allows passage of current generated in the electrode assembly 60 to pass through the current collector and out of the cell 20 to the cell terminal portion 86. In addition, each current collector 70, 71 allows passage of heat generated in the electrode assembly 60 to pass through the current collector and out of the cell 20 to the base 8 via the fin portion 78.

In some embodiments, the direct contact between each current collector 70, 71 and the corresponding electrode plates 61, 62 is achieved and/or ensured by applying a force to each current collector 70, 71. For example, each current collector 70, 71 is pressed against the plate stack 64 via a force that is internal to the cell. The force, represented by an arrow in FIG. 4, is directed perpendicular collection portion 72 and provides a pressure contact electrical connection between the current collector 70 and a peripheral edge of certain electrode plates of the plate stack 64 (e.g., electrode plates having a common electric polarity). In some embodiments, the force that urges the current collector 70, 70 against the plate stack 64 is achieved by providing an elastic member such (not shown) between one or both current collectors 71, 72 and the adjacent cell housing side 24, 26. In other embodiments, the force may be applied by providing an elastic member (not shown) between a row of cells and the battery pack housing sidewall 9.

In some embodiments, the first current collector 70 is formed of, or plated with, a first electrically conductive material that corresponds to the material used to form the positive electrode plates 61, such as aluminum. In addition, the second current collector 71 is formed of, or plated with, a second electrically conductive material that corresponds to the material used to form the negative electrode plates 62, such as copper.

However, in some embodiments in which the cell terminal portion 86 of the first current collector 70 (e.g., the positive terminal) of one cell 20 contacts and forms an electrical connection with the cell terminal portion 86 of the second current collector 71 (e.g., the negative terminal) 90 of an adjacent cell 20, it may be advantageous for at least portions of the first current collector 70 and the second current collector 71 to be formed of, or plated with the same material. To this end, in other embodiments, the cell terminal portion 86 of the first current collector 70 and the cell terminal portion 86 of the second current collector 71 are formed of or plated with the first material, and the collection portion 72 of the second current collector 71 is formed of or plated with the second material. In still other embodiments, the collector portion 72 of the first current collector 70 is formed of, or plated with, the first material, the collector portion 72 of second current collector 71 is formed of, or plated with, the second material, and the cell terminal portions 86 of the first and second current collectors 70, 71 are formed of, or plated with, a third electrically conductive material.

Figure 7:
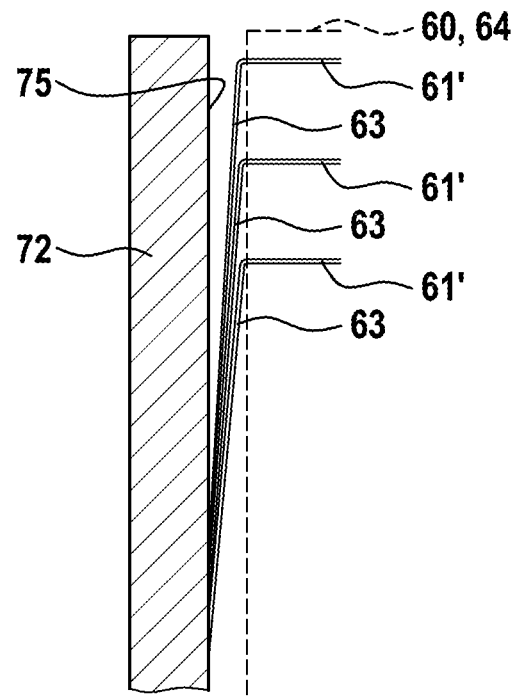
FIG. 7 is a partial a cross sectional view of a portion of the pouch cell of FIG. 2 illustrating an alternative electrode configuration, with the negative electrode plates and separator plates omitted for clarity.

Referring to FIG. 7, although the respective collection portions 72 of the first and second current collectors 71 are described above as being pressed against a peripheral edge of the corresponding positive or negative electrode plate 61, 62 to form the weld-free electrical connection, other connection configurations may be employed to form the weld-free electrical connection. For example, the clear lane 63 of each positive electrode plate 61' may be folded against a side of the plate stack 64. Likewise, the clear lane 65 of each negative electrode plate 62' may be folded against the opposed side of the plate stack 64 (not shown). Due to the relative spacing of the electrode plates 61, 62 along the stack axis 66, the folded clear lanes 63, 65 form an overlapping louvered configuration in which portions of each clear lane 63, 65 is exposed and faces the inward facing surface 75 of the respective collection portions 72. Thus, when the current collectors 70, 71 are urged against the plate stack 64, the inward facing surface 75 of the respective collection portions 72 directly contacts the clear lane 63, 65 of each electrode plate 61, 62 and forms an electrical connection therewith.

Figure 8:
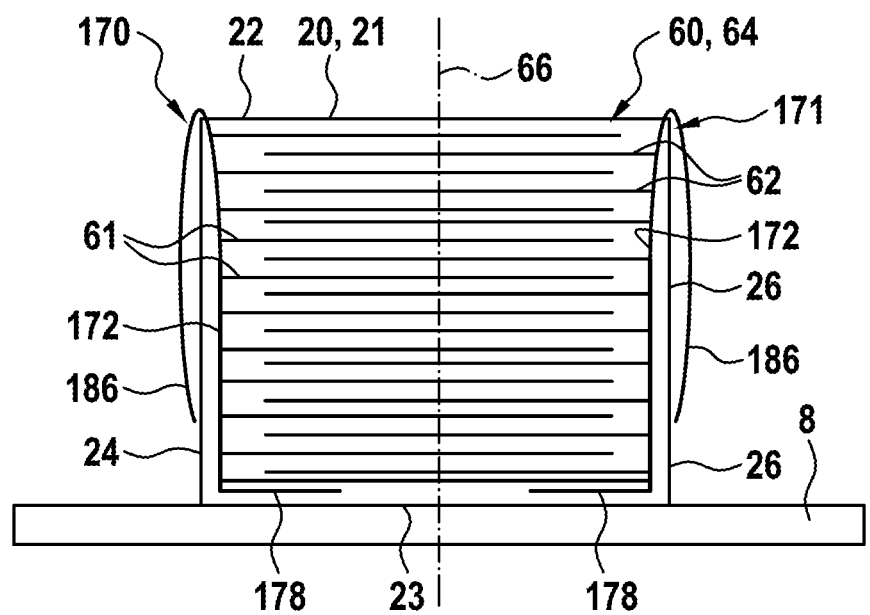
FIG. 8 is a schematic cross sectional view of a pouch cell illustrating an alternative embodiment pair of current collectors.
Figure 9:
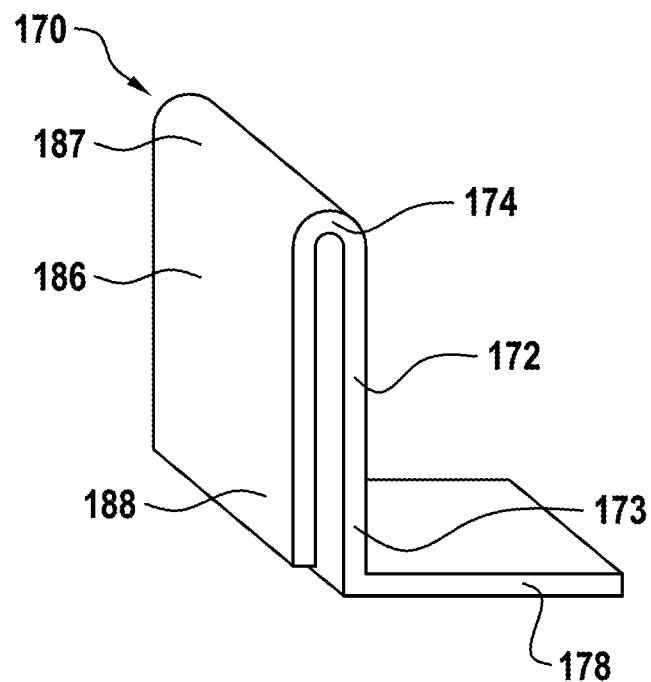
FIG. 9 is a perspective view of one of the current collector of FIG. 8.

Referring to FIGS. 8 and 9, an alternative embodiment pair of current collectors 170, 171 may be used in the cells 20. The pair of current collectors 170, 171 form an electrical and thermal connection with the electrode plates 60, 61 of the plate stack 64, and include a first current collector 170, and a second current collector 171 that has the same shape and dimensions as the first current collector 170. For this reason, only the first current collector 170 will be described in detail and common reference numbers will be used to refer to common elements.

The first current collector 170 is an electrically and thermally conductive thin plate having a folded and bent configuration. The first current collector 170 includes a collection portion 172 disposed inside the cell housing 21 and in direct contact with the electrode assembly 60, a fin portion 178 disposed inside the cell housing 21 and connected to a first end of the collection portion 172, and a cell terminal portion 186 disposed outside the cell housing 21 and connected to a second end of the cell terminal portion 186. In this embodiment, the cell housing 21 is interposed between the fin portion 178 and the cooling base 8.

The collection portion 172 is generally planar and is disposed between the electrode assembly 60 and a side (e.g., the first side 24) of the cell housing 21. The collection portion 172 extends in parallel to the first side 24 and is electrically and thermally connected to electrode plates of the electrode assembly 60 having a common polarity. In the illustrated embodiment, the collection portion 172 is electrically and thermally connected to the positive electrode plates 61. More specifically, the collection portion 172 of the first current collector 170 is disposed between the positive "clear lane" 63 of the positive electrode plates 61 and one side, e.g., the first side 24, of the cell housing 21. The collection portion 172 of the first current collector 170 is electrically and thermally connected via direct contact to the positive electrode plates 61 and joins the positive electrode plates 61 to both the (positive) cell terminal portion 86 and the base 8 disposed outside the cell housing 21, as discussed below.

A first end 173 of the collection portion 172 resides adjacent the cell housing second end 23, and an opposed second end 174 of the collection portion 172 protrudes out of the cell housing first end 22 by passing through the sealed joint at this location. The collection portion second end 174 is folded back on itself to form a U-shaped bend.

A first end 187 of the cell terminal portion 186 extends integrally from the collection portion second end 174, and thus is electrically and thermally connected to the collection portion 172. The cell terminal portion 186 is disposed on the outside of the cell housing 21 so as to overlie the cell housing first side 24. The cell terminal portion 186 is generally planar, and extends generally parallel to the collection portion 172. The cell terminal portion 186 has sufficient length that the cell terminal portion second end 188 is disposed adjacent the cell housing second end 23, and is slightly shorter than the collection portion 172.

Like the collection portion 172, the fin portion 178 is disposed on the inside of the cell housing 21. The fin portion 178 is generally planar and extends integrally from the first end 173 of the collection portion 172 so as to be arranged perpendicular to both the collection portion 172 and the cell terminal portion 186. Thus, the fin portion 178 is electrically and thermally connected to the collection portion 172, and extends in a direction parallel to, and overlies, the cell housing second end 23. The fin portion 178 is disposed between the electrode assembly 60 and the cell housing second end 23. More specifically, an outward-facing surface of the fin portion 178 rests on and directly contacts an inward-facing surface of the cell housing second end 23. Cooling of the electrode plates 61 is achieved via thermal conduction through the cell housing 21 to the base 8. The fin portion 178 has a length in a range of two percent to less than fifty percent of the length of the cell housing second end 23. In the illustrated embodiment, the fin portion 178 has a length of about 25 percent of the length of the cell housing second end 23, whereby a relatively large area of indirect contact is provided between the fin portion 78 and the base 8, resulting in efficient cooling within the cell 20.

The second current collector 171 is disposed in the cell housing 21 on an opposed side of the electrode assembly 60 relative to the first current collector 170, and the collection portion 172 of the second current collector 171 is electrically and thermally connected to the negative electrode plates 62. In particular, the collection portion 172 of the second current collector 171 is disposed between the negative clear lane 65 of the negative electrode plates 62 and the opposed side, e.g., the third side 26, of the cell housing 21. The collection portion 172 of the second current collector 171 is electrically and thermally connected via direct contact to the negative electrode plates 62 and joins the negative electrode plates 62 to both the (negative) cell terminal portion 186 and, via the fin portion 178 of the second current collector 171, to the base 8 disposed outside the cell housing 21.

Figure 10:
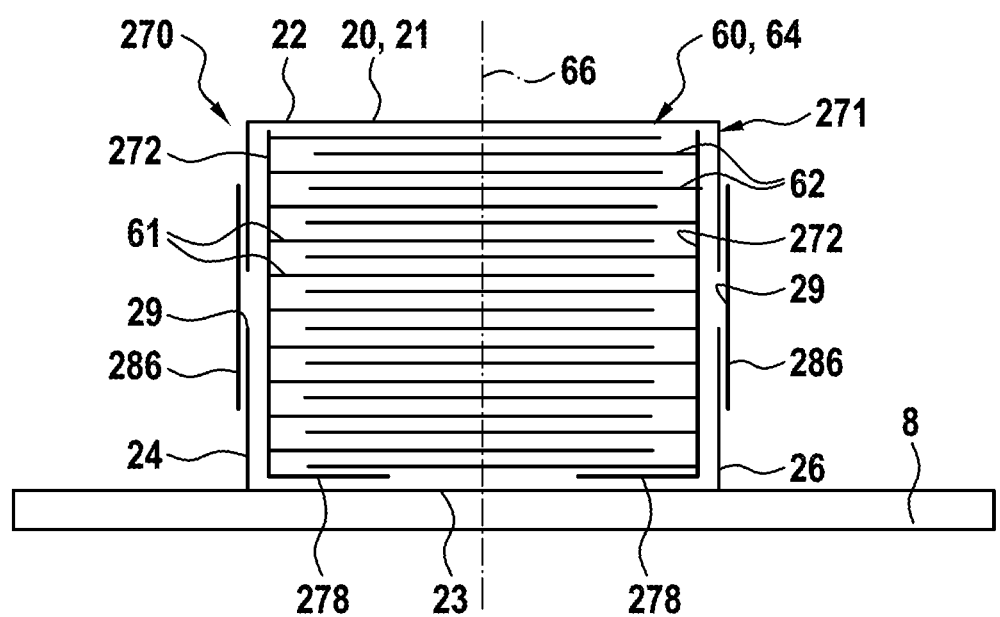
FIG. 10 is a schematic cross sectional view of a pouch cell illustrating another alternative embodiment pair of current collectors.
Figure 11:
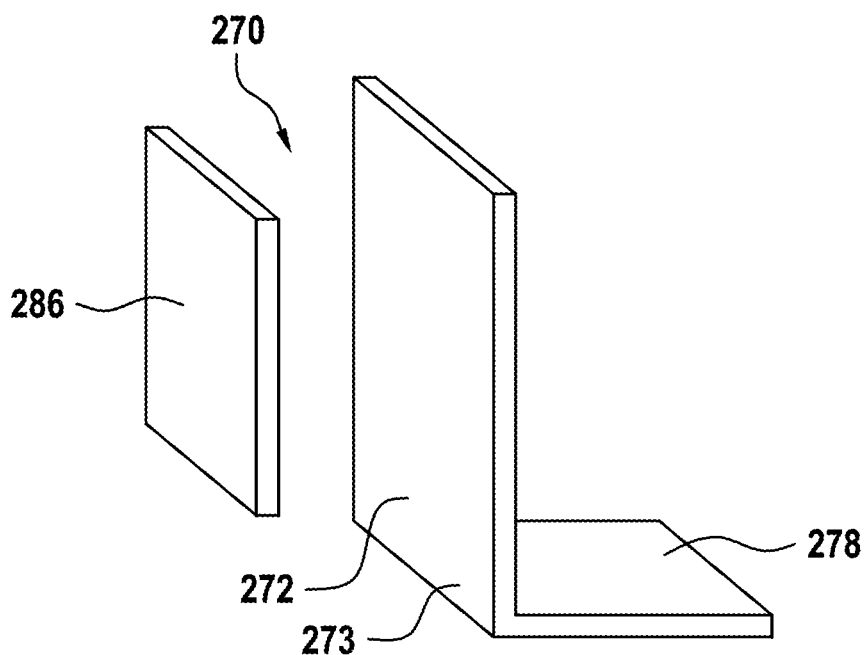
FIG. 11 is a perspective view of one of the current collectors of FIG. 10.

Referring to FIGS. 10 and 11, another alternative embodiment pair of current collectors 270, 271 may be used in the cells 20. The pair of current collectors 270, 271 form an electrical and thermal connection with the electrode plates 60, 61 of the plate stack 64, and include a first current collector 270, and a second current collector 271 that has the same shape and dimensions as the first current collector 270. For this reason, only the first current collector 270 will be described in detail and common reference numbers will be used to refer to common elements.

The first current collector 270 is an electrically and thermally conductive thin plate having a layered and bent configuration. The first current collector 270 includes a collection portion 272 disposed inside the cell housing 21 and in direct contact with the electrode assembly 60, and a fin portion 278 disposed inside the cell housing 21 and connected to a first end 273 of the collection portion 272. A cell terminal 286 is disposed outside the cell housing 21 and forms an electrical connection to the collection portion 272 via an opening 29 in the side 24 of the cell housing 21. In this embodiment, the cell housing 21 is interposed between the fin portion 278 and the base 8.

The collection portion 272 is generally planar and is disposed between the electrode assembly 60 and a side (e.g., the first side 24) of the cell housing 21. The collection portion 272 extends in parallel to the first side 24 and is electrically and thermally connected to electrode plates of the electrode assembly 60 having a common polarity. In the illustrated embodiment, the collection portion 272 is electrically and thermally connected to the positive electrode plates 61. More specifically, the collection portion 272 of the first current collector 270 is disposed between the positive "clear lane" 63 of the positive electrode plates 61 and one side, e.g., the first side 24, of the cell housing 21. The collection portion 272 of the first current collector 270 is electrically and thermally connected via direct contact to the positive electrode plates 61 and joins the positive electrode plates 61 to both the (positive) cell terminal portion 286 and the base 8 disposed outside the cell housing 21, as discussed below.

The cell terminal portion 286 is disposed on the outside of the cell housing 21 so as to overlie the cell housing first side 24. The cell terminal portion 286 is generally planar plate, and extends generally parallel to the collection portion 272. In the illustrated embodiment, the cell terminal portion 286 is rectangular in shape, but is not limited to this shape. The collection portion 272 directly contacts and passes current and thermal energy to cell terminal portion 286 via the opening. Although "direct contact" is not illustrated in FIG. 10 due to the schematic nature of this figure, direct contact is possible due to the relative thinness of the respective components, and/or due to an applied external force which urges the collection portion 272 and cell terminal portion 286 together.

Like the collection portion 272, the fin portion 278 is disposed on the inside of the cell housing 21. The fin portion 278 is generally planar and extends integrally from the first end 273 of the collection portion 272 so as to be arranged perpendicular to both the collection portion 272 and the cell terminal portion 286. Thus, the fin portion 278 is electrically and thermally connected to the collection portion 272, and extends in a direction parallel to, and overlies, the cell housing second end 23. The fin portion 278 is disposed between the electrode assembly 60 and the cell housing second end 23. More specifically, an outward-facing surface of the fin portion 278 rests on and directly contacts an inward-facing surface of the cell housing second end 23. Cooling of the electrode plates 61 is achieved via thermal conduction through the cell housing 21 to the base 8. The fin portion 278 has a length in a range of two percent to less than fifty percent of the length of the cell housing second end 23. In the illustrated embodiment, the fin portion 278 has a length of about 25 percent of the length of the cell housing second end 23, whereby a relatively large area of indirect contact is provided between the fin portion 278 and the base 8, resulting in efficient cooling within the cell 20.

The second current collector 271 is disposed in the cell housing 21 on an opposed side of the electrode assembly 60 relative to the first current collector 270, and the collection portion 272 of the second current collector 271 is electrically and thermally connected to the negative electrode plates 62. In particular, the collection portion 272 of the second current collector 271 is disposed between the negative clear lane 65 of the negative electrode plates 62 and the opposed side, e.g., the third side 26 of the cell housing 21. The collection portion 272 of the second current collector 271 is electrically and thermally connected via direct contact to the negative electrode plates 62 and joins the negative electrode plates 62 to both the (negative) cell terminal portion 286 and, via the fin portion 278 of the second current collector 271, to the base 8 disposed outside the cell housing 21.

In the embodiments illustrated in FIGS. 8-11, the cell housing 21 is disposed between the fin portion 178, 278 of each current collector 170, 171, 270, 271 and the base 8. Since an inner surface of the cell housing 21 is electrically non-conductive, the inward-facing surface of the base 8 does not need to be formed of or coated with a non-electrically conductive material to prevent an electrical short circuit between the respective fin portions 178, 278 of each current collector pair 170, 171, 270, 271.

Figure 12:
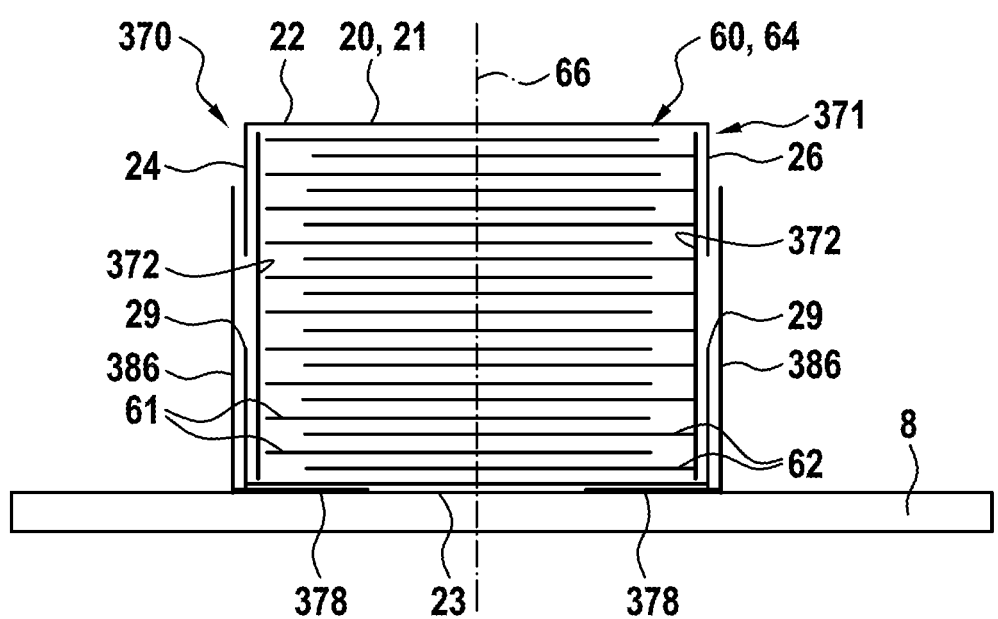
FIG. 12 is a schematic cross sectional view of a pouch cell illustrating another alternative embodiment pair of current collectors.

Referring to FIG. 12, another alternative embodiment pair of current collectors 370, 371 may be used in the cells 20. The pair of current collectors 370, 371 form an electrical and thermal connection with the electrode plates 60, 61 of the plate stack 64, and include a first current collector 370, and a second current collector 371 that has the same shape and dimensions as the first current collector 370. For this reason, only the first current collector 370 will be described in detail and common reference numbers will be used to refer to common elements.

The first current collector 370 is an electrically and thermally conductive thin plate having a layered and bent configuration. The first current collector 370 includes a collection portion 372 disposed inside the cell housing 21 and in direct contact with the electrode assembly 60, a fin portion 378 disposed outside the cell housing 21 and in direct contact with the cooling base 8, and a cell terminal portion 386 disposed outside the cell housing 21. The cell terminal portion 386 forms an electrical and thermal connection to the collection portion 372 via an opening 29 in the side 24 of the cell housing 21. The fin portion 378 is connected to an end of the cell terminal portion 386.

The collection portion 372 is generally planar and is disposed between the electrode assembly 60 and a side (e.g., the first side 24) of the cell housing 21. The collection portion 372 extends in parallel to the first side 24 and is electrically and thermally connected to electrode plates of the electrode assembly 60 having a common polarity. In the illustrated embodiment, the collection portion 372 is electrically and thermally connected to the positive electrode plates 61. More specifically, the collection portion 372 of the first current collector 370 is disposed between the positive "clear lane" 63 of the positive electrode plates 61 and one side, e.g., the first side 24, of the cell housing 21. The collection portion 372 of the first current collector 370 is electrically and thermally connected via direct contact to the positive electrode plates 61 and joins the positive electrode plates 61 to both the (positive) cell terminal portion 386 and the base 8 disposed outside the cell housing 21, as discussed below.

The cell terminal portion 386 is disposed on the outside of the cell housing 21 so as to overlie the cell housing first side 24. The cell terminal portion 386 is generally planar, and extends generally parallel to the collection portion 372. The cell terminal portion 386 has sufficient length that the cell terminal portion second end 388 is disposed adjacent the cell housing second end 23, and is slightly longer than the collection portion 372.

In the illustrated embodiment, the collection portion 372 directly contacts and passes current and thermal energy to cell terminal portion 386 via the opening 29. Although "direct contact" is not illustrated in FIG. 12 due to the schematic nature of this figure, direct contact is possible due to the relative thinness of the respective components, and/or due to an applied external force which urges the collection portion 372 and cell terminal portion 386 together.

Like the cell terminal portion 386, the fin portion 378 is disposed on the outside of the cell housing 21. The fin portion 378 is generally planar and extends integrally from the second end 388 of the cell terminal portion 386 so as to be arranged perpendicular to both the collection portion 372 and the cell terminal portion 386. The fin portion 378 is electrically and thermally connected to the collection portion 372 via the cell terminal portion 386, and extends in a direction parallel to, and underlies, the cell housing second end 23. The fin portion 378 is disposed between the cell housing second end 23 and the cooling base 8. More specifically, an outward-facing surface of the fin portion 378 rests on and directly contacts an inward-facing surface of the base 8. The fin portion 378 has a length in a range of two percent to less than fifty percent of the length of the cell housing second end 23. In the illustrated embodiment, the fin portion 378 has a length of about 25 percent of the length of the cell housing second end 23, whereby a relatively large area of direct contact is provided between the fin portion 378 and the base 8, resulting in efficient cooling within the cell 20.

The second current collector 371 is disposed in the cell housing 21 on an opposed side of the electrode assembly 60 relative to the first current collector 370, and the collection portion 372 of the second current collector 371 is electrically and thermally connected to the negative electrode plates 62. In particular, the collection portion 372 of the second current collector 371 is disposed between the negative clear lane 65 of the negative electrode plates 62 and the opposed side, e.g., the third side 26, of the cell housing 21. The collection portion 372 of the second current collector 371 is electrically and thermally connected via direct contact to the negative electrode plates 62 and joins the negative electrode plates 62 to both the (negative) cell terminal portion 386 and, via the fin portion 378 of the second current collector 371, to the base 8 disposed outside the cell housing 21.

Figure 13:
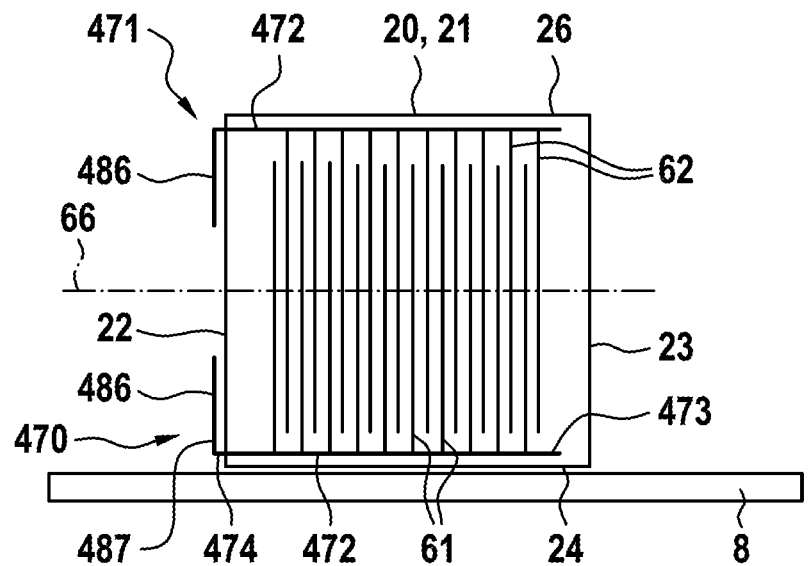
FIG. 13 is a schematic cross sectional view of a pouch cell illustrating another alternative embodiment pair of current collectors.

Referring to FIG. 13, an alternative embodiment pair of current collectors 470, 471 may be used in the cells 20. The pair of current collectors 470, 471 form an electrical and thermal connection with the electrode plates 60, 61 of the plate stack 64, and include a first current collector 470, and a second current collector 471 that has the same shape and dimensions as the first current collector 470. For this reason, only the first current collector 470 will be described in detail and common reference numbers will be used to refer to common elements.

The first current collector 470 is an electrically and thermally conductive thin plate having a bent configuration. The first current collector 470 includes a collection portion 472 disposed inside the cell housing 21 and in direct contact with the electrode assembly 60 and a cell terminal portion 486 disposed outside the cell housing 21 and connected to a second end of the collection portion 472. In this embodiment, cell 20 is oriented relative to the base 8 such that the stack axis 66 is parallel to the base 8. As a result, the collection portion 472 is parallel to, and overlies, the cooling base 8 with the cell housing 21 interposed between the collection portion 472 and the base 8.

The collection portion 472 is generally planar and is disposed between the electrode assembly 60 and a side (e.g., the first side 24) of the cell housing 21. The collection portion 472 extends in parallel to the first side 24 and is electrically and thermally connected to electrode plates of the electrode assembly 60 having a common polarity. In the illustrated embodiment, the collection portion 472 is electrically and thermally connected to the positive electrode plates 61. More specifically, the collection portion 472 of the first current collector 470 is disposed between the positive "clear lane" 63 of the positive electrode plates 61 and one side, e.g., the first side 24, of the cell housing 21. The collection portion 472 of the first current collector 470 is electrically and thermally connected via direct contact to the positive electrode plates 61 and joins the positive electrode plates 61 to both the (positive) cell terminal portion 486 and the cooling base 8 disposed outside the cell housing 21, as discussed below.

A first end 473 of the collection portion 472 resides adjacent the cell housing second end 23, and an opposed second end 474 of the collection portion 472 protrudes out of the cell housing first end 22 by passing through the sealed joint at this location.

A first end 487 of the cell terminal portion 486 extends integrally from the collection portion second end 474, and thus is electrically and thermally connected to the collection portion 472. The cell terminal portion 486 is disposed on the outside of the cell housing 21 so as to overlie the cell housing first end 22. The cell terminal portion 486 is generally planar, and extends generally perpendicular to the collection portion 472.

Unlike previous embodiments, the first current collector 470 does not include separate fin portion. Instead, the collection portion 472 serves as a fin portion since cooling of the positive electrode plates 61 is achieved via thermal conduction from the current collector 470 through the cell housing 21 to the cooling base 8. The collection portion has a length in a range of fifty percent to 100 percent of the length of the cell housing first side 24, whereby a relatively large area of indirect contact is provided between the collection portion 472 and the base 8, resulting in efficient cooling within the cell 20.

The second current collector 471 is disposed in the cell housing 21 on an opposed side of the electrode assembly 60 relative to the first current collector 470, and the collection portion 472 of the second current collector 471 is electrically and thermally connected to the negative electrode plates 62. In particular, the collection portion 472 of the second current collector 471 is disposed between the negative clear lane 65 of the negative electrode plates 62 and the opposed side, e.g., the third side 26, of the cell housing 21. The collection portion 472 of the second current collector 471 is electrically and thermally connected via direct contact to the negative electrode plates 62 and joins the negative electrode plates 62 to the (negative) cell terminal portion 486. Although the collection portion 472 of the second current collector 471 does not have a direct thermal conduction path to the base 8, it provides cooling of the negative electrode plates 62 via thermal conduction to the atmosphere via the cell housing third side 26.

Figure 14:
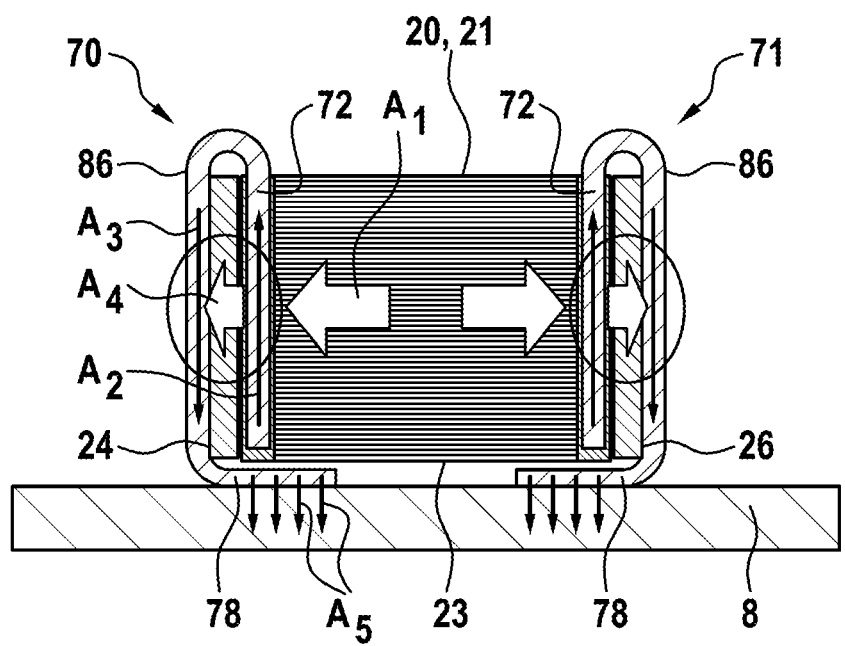
FIG. 14 is another schematic cross sectional view of the pouch cell of FIG. 2 as seen across line 5-5 of FIG. 2, illustrating thermal conduction pathways provided by the current collectors.

Referring to FIG. 14, the current collectors described herein provide a direct thermal conduction pathway from the electrode plates 60, 61 to the exterior of the cell housing 21. For example, with reference to the embodiment described above in FIG. 5, arrows are used to show direct thermal conduction pathways through the current collectors 70, 71. Heat generated in the electrode plates 61, 62 travels perpendicular to the stack axis 66 to the collection portions 72, 72 (arrow A1). The heat travels through a first path along the length of the collection portion 72 (arrow A2), out of the first end 22 of the cell housing 21, along the length of the cell terminal portion 86 (arrow A3) and to the fin portion 78. The heat also travels through a second path from the collection portion 72, through the cell side 24, 26 to the cell terminal portion 86 (arrow A4) and to the fin portion 78. In both paths, the heat is conducted directly from the fin portion 78 to the base 8 (arrows A5), which is a heat sink.

The fin portion 78, 178, 278, 378 of the current collectors are described herein as having a length in a range of two percent to less than fifty percent of the length of the cell housing second end 23. However, the fin portion is not limited to this configuration. For example, in some embodiments, the fin of the positive current collector 70 has a different length than the fin of the negative current collector 71. By providing the fin of one polarity in a length that is greater than the length of the fin of the other polarity, more thermal energy can be transferred via the longer fin. It is possible for a fin of one polarity to be up to 100% of the length of the cell housing second end 23, and the fin of the other polarity to have a zero length. In this case, heat is transferred from every other electrode—either all the anodes or all the cathodes.

The current collectors described herein, including the collector portion 72, 172, 272, 372, 427, the fin portion 78, 178, 278, 378 and the cell terminal portion 86, 186, 286, 386, 486, is relatively wide, having a width w2 that is in a range of 30 percent to 98 percent a width w1 of the cell housing 21. In the illustrated embodiment, the width w2 is slightly less than the width w1 of the cell housing 21. By providing a wide current collector, the area of electrical and thermal connections is maximized.

Although the cell housing 21 is described herein as being a pouch cell housing formed of a metal laminated film, the cell housing 21 is not limited to this material or configuration. For example, the cell housing 21 may be formed of other materials and/or may be formed having a prismatic, cylindrical or other configuration.

Although the electrode assembly 60 is described herein as being, a "stacked" electrode assembly that includes a series of stacked plates 61, 62, the electrode assembly 60 is not limited to this configuration. For example, in some embodiments, the electrode assembly 60 may include a rolled electrode assembly (e.g., a jelly roll assembly), a folded electrode assembly (i.e., a Z-fold assembly), or other electrode arrangement.

Although the cell 20 has a cube-shaped cell housing 21, the cell housing 21 is not limited to a cube shape. For example, the cell housing 21 may be rectangular in shape. In another example, the cell housing 21 may have other polygonal shapes that permit close packing such as an eight surface structure having hexagonally arranged sides (not shown).

In the illustrated embodiments, the cells 20 have a lithium-ion cell chemistry. Lithium-ion cells are well-suited for use in the battery pack 1 due to their high specific energy and energy density relative to other rechargeable cell chemistries. However, the cells 20 are not limited to having a lithium-ion cell chemistry. For example, the cells 20 may have aluminum-ion, alkaline, nickel-cadmium, nickel metal hydride, or other type of cell chemistry as appropriate for the specific application.

Selective illustrative embodiments of the battery pack including the cell are described above in some detail. It should be understood that only structures considered necessary for clarifying these devices have been described herein. Other conventional structures, and those of ancillary and auxiliary components of the battery pack, are assumed to be known and understood by those skilled in the art. Moreover, while working examples of the battery pack and cell have been described above, the battery pack and/or cell are not limited to the working examples described above, but various design alterations may be carried out without departing from the devices as set forth in the claims.

What is claimed is:

1. An electrochemical cell comprising
   a polyhedronal cell housing formed of a flexible laminate material, the cell housing including a first end, a second end opposed to the first end, and a multi-sided sidewall that extends between the first end and the second end,
   an electrode assembly disposed in the cell housing, the electrode assembly including a positive electrode plate, a negative electrode plate and a separator, the positive electrode plate stacked with the negative electrode plate, the separator disposed between the positive electrode plate and the negative electrode plate, the electrode assembly including a stack axis that extends in parallel to a stacking direction of the positive electrode plate, the negative electrode plate and the separator, the stack axis extending parallel to the sidewall and perpendicular to the cell housing first and second ends, and
   a current collector, the current collector comprising
      a collection portion disposed in the cell housing so as to reside between the electrode assembly and one side of the multi-sided sidewall, the collection portion extending parallel to the one side and being electrically and thermally connected to one of the positive electrode plate and the negative electrode plate, and
      a fin portion that is disposed outside the cell housing, is electrically and thermally connected to the collection portion, extends in a direction parallel to the second end and overlies the second end, and
      a terminal disposed outside of the cell housing so as to overlie the one side, the terminal being electrically and thermally connected to the collection portion.

2. The electrochemical cell of claim 1, wherein a first end of the terminal is connected to the collection portion and a second end of the terminal is connected to the fin portion, and the second end is opposed to the first end.

3. The electrochemical cell of claim 1, wherein the fin portion is disposed inside the cell housing between the electrode assembly and the second end.

4. The electrochemical cell of claim 3, wherein the terminal is connected to a second end of the collection portion and the fin portion is connected to a first end of the collection portion, and the second end is opposed to the first end.

5. The electrochemical cell of claim 3, wherein the terminal is connected to the collection portion via an opening in the one side.

6. The electrochemical cell of claim 1, wherein
the current collector is a positive current collector and is electrically d thermally connected to the positive electrode plate, and
the electrochemical cell comprises a negative current collector, the negative current collector comprising
a collection portion disposed in the cell housing between the electrode assembly and the sidewall, the collection portion extending parallel to the sidewall and being electrically and thermally connected to the negative electrode plate, and
a fin portion that is disposed outside the cell housing is electrically and thermally to the collection portion, extends in a direction parallel to the second end and overlies the second end, and
the positive current collector and the negative current collector each pass through the cell housing at the first end.

7. The electrochemical cell of claim 1, wherein the current collector has a dimension in a direction that is transverse to the stack axis and parallel to the one side, and the dimension is in a range of 30 percent to 98 percent of a corresponding dimension of the one side.

8. The electrochemical cell of claim 1, wherein the current collector provides two thermal conduction pathways between the one of the positive electrode plate and the negative electrode plate and an exterior of the cell housing.

9. A battery pack comprising
a thermally-conductive plate configured to provide one of heating and cooling,
electrochemical cells supported on the thermally-conductive plate, each cell including
a polyhedronal cell housing formed of a flexible laminate material, the cell housing including a first end, a second end opposed to the first end and facing the thermally-conductive plate, and a multi-sided sidewall that extends between the first end and the second end,
an electrode assembly disposed in the cell housing, the electrode assembly including a positive electrode plate, a negative electrode plate and a separator, the positive electrode plate stacked with the negative electrode plate, the separator disposed between the positive electrode plate and the negative electrode plate, the electrode assembly including a stack axis that extends in parallel to a stacking direction of the positive electrode plate, the negative electrode plate and the separator, the stack axis extending parallel to the sidewall and perpendicular to the cell housing first and second ends, and
a current collector, the current collector comprising
a collection portion disposed in the cell housing so as to reside between the electrode assembly and one side of the multi-sided sidewall, the collection portion extending parallel to the one side and being electrically and thermally connected to one of the positive electrode plate and the negative electrode plate, and
a fin portion that is disposed outside the cell housing, is electrically and thermally connected to the collection portion, extends in a direction parallel to the second end and overlies the second end, and
a terminal disposed outside of the cell housing so as to overlie the one side, the terminal being electrically and thermally connected to the collection portion.

10. Me electrochemical cell of claim 9, wherein a first end of the terminal is connected to the collection portion and a second end of the terminal is connected to the fin portion, and the second end is opposed to the first end.

11. The electrochemical cell of claim 9, wherein the fin portion is disposed inside the cell housing between the electrode assembly and the second end.

12. The electrochemical cell of claim 11, wherein the terminal is connected to a first end of the collection portion and the fin portion is connected to a second end of the collection portion, and the second end is opposed to the first end.

13. The electrochemical cell of claim 11, wherein the terminal is connected to the collection portion via an opening in the one side.

14. The electrochemical cell of claim 9, wherein
the current collector is a positive current collector and is electrically and thermally connected to the positive electrode plate, and
the electrochemical cell comprises a negative current collector, the negative current collector comprising
a collection portion, disposed in the cell housing between the electrode assembly and another side of the multi-sided sidewall, the collection portion extending parallel to the sidewall and being electrically and thermally connected to the negative electrode plate, and
a fin portion that is disposed outside the cell housing, is electrically and thermally to the collection portion, extends in a direction parallel to the second end and overlies the second end, and
the positive current collector and the negative current collector each pass through the cell housing at the first end.

15. The electrochemical cell of claim 9, wherein the current collector has a dimension in a direction that is transverse to the stack axis and parallel to the one side, and the dimension is in a range of 30 percent to 98 percent of a corresponding dimension of the one, side.

16. The electrochemical cell of claim 9, wherein the current collector provides two thermal conduction pathways between the one of the positive electrode plate and the negative electrode plate and an exterior of the cell housing.

17. A battery pack comprising
a thermally-conductive plate configured to provide one of heating and cooling,
electrochemical cells supported on the thermally-conductive plate, each cell including
a polyhedronal cell housing formed of a flexible laminate material, the cell housing including a first end, a second end opposed to the first end, and a multi-sided sidewall that extends between the first end and the second end, a first side of the multi-sided sidewall facing the thermally-conductive plate,
an electrode assembly disposed in the cell housing, the electrode assembly including a positive electrode plate, a negative electrode plate and a separator, the positive electrode plate stacked with the negative electrode plate, the separator disposed between the positive electrode plate and the negative electrode plate, the electrode assembly including a stack axis that extends in parallel to a stacking direction of the positive electrode plate, the negative electrode plate and the separator, the stack axis extending perpendicular to the cell housing first and second ends,
a first current collector disposed in the cell housing, the first current collector disposed between the electrode assembly and the first side, the first current collector extending parallel to the first side and being electrically and thermally connected to one of the positive electrode plate and the negative electrode plate,
a second current collector disposed in the cell housing, the second current collector disposed between the electrode assembly and a third side of the multi-sided sidewall, the third side being opposed to the first side, the second current collector extending parallel to the third side and being electrically and thermally connected to the other of the positive electrode plate and the negative electrode plate,
a first terminal disposed on the outside of the cell housing so as to overlie the cell housing, the first terminal being electrically and thermally connected to the first current collector, and
a second terminal disposed on the outside of the cell housing so as to overlie the cell housing, the second terminal being electrically and thermally connected to the second current collector,
wherein the positive current collector and the negative current collector each exit the cell housing at the first end, and
the first current collector provides a thermal conduction path from the electrode assembly to the thermally-conductive plate via the first side.

18. An electrochemical cell comprising
a polyhedronal cell housing formed of a flexible laminate material, the cell housing including a first end, a second end opposed to the first end, and a multi-sided sidewall that extends between the first end and the second end,
an electrode assembly disposed in the cell housing, the electrode assembly including a positive electrode plate, a negative electrode plate and a separator, the positive electrode plate stacked with the negative electrode plate, the separator disposed between the positive electrode plate and the negative electrode plate, the electrode assembly including a stack axis that extends in parallel to a stacking direction of the positive electrode plate, the negative electrode plate and the separator, the stack axis extending parallel to the sidewall and perpendicular to the cell housing first and second ends, and
a current collector comprising a plate having a folded and bent configuration, the plate including:
a collection portion that provides one end of the plate and is disposed inside the cell housing between the electrode assembly and one side of the multi-sided sidewall, the collection portion extending in parallel to the one side, the collection portion being electrically and thermally connected to one of the positive electrode plate and the negative electrode plate;
a fin portion that provides an end of the plate that is opposed to the one end of the plate, the fin portion being disposed outside of the cell housing so as to overlie the second end, the fin portion extending in a direction parallel to the second end, and
a terminal portion that provides a central portion of the plate and is disposed outside of the cell housing so as to overlie the one side, one end of the terminal portion being electrically and thermally connected to one end of the collection portion.

\* \* \* \* \*

UNITED STATES PATENT AND TRADEMARK OFFICE
CERTIFICATE OF CORRECTION

PATENT NO. : 11,289,746 B2
APPLICATION NO. : 15/145227
DATED : March 29, 2022
INVENTOR(S) : Schoenherr et al.

It is certified that error appears in the above-identified patent and that said Letters Patent is hereby corrected as shown below:

In the Claims

In Claim 6:
At Column 17, Line 9: "electrically d thermally connected" should read --electrically and thermally connected--;
At Column 17, Line 19: "outside the cell housing is" should read --outside the cell housing, is--; and
At Column 17, Line 20: "electrically and thermally to" should read --electrically and thermally connected to--.

In Claim 10:
At Column 18, Line 7: "Me electrochemical cell" should read --The electrochemical cell--.

In Claim 14:
At Column 18, Line 28: "a collection portion, disposed in" should read --a collection portion disposed in--; and
At Column 18, Line 35: "electrically and thermally to" should read --electrically and thermally connected to--.

In Claim 15:
At Column 18, Line 45: "the one, side" should read --the one side--.

Signed and Sealed this
Nineteenth Day of July, 2022

Katherine Kelly Vidal
*Director of the United States Patent and Trademark Office*